United States Patent [19]

Harwood et al.

[11] Patent Number: 4,686,561
[45] Date of Patent: Aug. 11, 1987

[54] VERTICAL DETAIL INFORMATION RESTORATION CIRCUIT

[75] Inventors: Leopold A. Harwood, Bridgewater; Robert A. Wargo, Ringoes; Chandrakant B. Patel, Hopewell, all of N.J.

[73] Assignee: RCA Corporation, Princeton, N.J.

[21] Appl. No.: 760,910

[22] Filed: Jul. 31, 1985

[51] Int. Cl.[4] .............................................. H04N 5/21
[52] U.S. Cl. ........................................ 358/31; 358/38; 358/37; 358/36
[58] Field of Search .................. 358/31, 36, 37, 21 R, 358/40, 38

[56] References Cited

U.S. PATENT DOCUMENTS

| | | | |
|---|---|---|---|
| 3,634,615 | 6/1969 | Sasaki et al. | 358/21 R |
| 4,072,984 | 4/1975 | Kaiser | 358/31 |
| 4,179,705 | 3/1978 | Faroudja | 358/31 |
| 4,240,105 | 8/1979 | Faroudja | 358/31 |
| 4,262,304 | 4/1981 | Faroudja | 358/37 |
| 4,389,665 | 9/1981 | Nagao et al. | 358/23 |
| 4,404,584 | 9/1983 | Pritchaird | 358/31 |
| 4,472,733 | 9/1984 | Bolger | 358/38 |
| 4,590,513 | 5/1986 | Craft | 358/31 |

Primary Examiner—James J. Groody
Assistant Examiner—Victor R. Kostak
Attorney, Agent, or Firm—Paul J. Rasmussen; Eric P. Herrmann; David N. Caracappa

[57] ABSTRACT

In a composite color video signal, a portion of the signal spectrum is shared by high frequency vertical detail information, and high frequency modulated color difference (I) information. A circuit is described which determines whether the information in the shared frequency band is vertical detail information or color difference information without degradation in the presence of a step input signal, as, for example, in the presence of lettering in the image. A composite video signal is comb filtered to generate comb filtered chrominance and luminance signals. A baseband color difference signal is produced from the comb filtered chrominance signal and the presence of high frequency information in the baseband color difference signal is detected. The bandwidth of the low frequency portion of the comb filtered chrominance signal (i.e. the vertical detail information) which is restored to the comb filtered luminance signal is varied in response to the control signal.

9 Claims, 6 Drawing Figures

VERTICAL DETAIL INFORMATION RESTORATION CIRCUIT

The present invention relates to a composite video signal processing system including a comb filter. In particular, a circuit is described which restores vertical detail information from the comb filtered chrominance signal to the comb filtered luminance signal, without degradation in the presence of a step input signal.

Composite video signal processing systems such as, for example, color television receivers, are often required to separate the chrominance information and the luminance information from the composite signal. Once separated, the chrominance and luminance information may be processed appropriately by their respective processing circuitry.

In an NTSC video signal, for example, the chrominance information is generated from a pair of color difference signals. An I color difference signal has a bandwidth of approximately 1.2 MHz and modulates a color subcarrier. A Q color difference signal has a bandwidth of 0.6 MHz and modulates the same color subcarrier in quadrature. The color subcarrier has a frequency such that the sidebands generated by the modulated I and Q signals are frequency interleaved with the luminance information.

The bandwidth of the luminance information is approximately 4.2 MHz. The color subcarrier is placed at about 3.58 MHz. The Q color difference signal double sideband modulates the color subcarrier and normally occupies the frequency band from 0.6 MHz below the subcarrier to 0.6 MHz above the subcarrier (i.e. about 3 to 4 MHz). The I color difference signal vestigial sideband modulates the subcarrier and normally occupies the band of frequencies from 1.2 MHz below the subcarrier to 0.6 MHz above the subcarrier (i.e. about 2.4 to 4 MHz).

When a comb filter is used to separate the chrominance and the luminance signal from the composite video signal, some luminance information may be present at the chrominance signal output of the comb filter. This luminance information is called the vertical detail information and occupies a lower frequency portion of the comb filtered chrominance signal. The chrominance information on the other hand occupies the higher frequency portion of this signal. As used herein, the term "comb filtered chrominance signal" refers to the output of the comb filter normally designated the chrominance output, even though it may contain some luminance information.

In the comb filtered chrominance signal, there is a frequency range from 1.2 MHz below the subcarrier frequency to 0.6 MHz below the subcarrier frequency (2.4 MHz to 3.0 MHz) which is shared by the high frequency modulated I signal and the high frequency vertical detail luminance signal. It is desirable that the information in this shared frequency range be restored to the comb filtered luminance signal if it is vertical detail information, but not if it is color difference information.

U.S. Pat. No. 4,651,196 issued to L. A. Harwood and C. B. Patel on Mar. 17, 1987, and entitled "Adaptive Control of the Chrominance Signal Frequency Response in a Video Signal Processing System" discloses apparatus for properly controlling the bandwidth of the vertical detail information signal. In the above-mentioned application, an adaptive low-pass filter is coupled between the chrominance output of a comb filter and an adder which combines a vertical detail information signal with the signal at the luminance output of the comb filter, thus producing the restored luminance signal. A band-pass filter having a fixed passband responds to a narrow band of frequencies in the shared frequency band. In the presence of a signal at the output of the band-pass filter, the bandwidth of the adaptive low-pass filter supplying the vertical detail information to the adder is narrowed. Conversely, in the absence of a signal at the output of the band-pass filter, the bandwidth of the adaptive low-pass filter is widened.

Apparatus according to the above-mentioned application utilizes only a fraction of the allowable bandwidth of the shared frequency band to make a decision as to the bandwidth of the vertical detail information signal. In addition, in the presence of a step in the comb filtered chrominance signal, the output of the band-pass filter has a tendency to ring. This may provide misinformation as to the presence or absence of a signal within the frequency band. This situation occurs, for example, when a large chrominance change is induced by a signal representing letters. This effect is most noticable when letters with slanted lines (e.g. X, A or Y) are displayed.

It is desirable to determine the information content of the shared frequency band, and restore this information to the luminance channel if it is vertical detail information without degrading the reproduced picture especially in the presence of letters displayed on the screen.

To determine whether the signal in the shared frequency band is vertical detail information, signals in the higher frequency portion of a baseband color difference signal may be detected. If such signals are detected, then the information in the shared frequency band may be assumed to be color difference information. In such a case, the vertical detail information restored to the luminance channel is filtered to have a relatively narrower bandwidth, and will not include the information in the shared frequency band.

On the other hand, if no such signals are detected in the high frequency portion of the baseband color difference signal, then the information in the shared frequency band is assumed to be vertical detail information. In this case, the vertical detail information restored to the luminance channel is filtered to have a relatively wider bandwidth, and will include the information in the shared frequency band.

In accordance with the principles of the present invention, a vertical detail information restoration circuit processes a composite video signal which has been comb filtered. A means is provided for combining a low frequency portion of the comb filtered chrominance signal with the comb filtered luminance signal. A further means is provided for producing a baseband color difference signal from the comb filtered chrominance signal. A detecting means detects signals occurring in a higher frequency portion of the baseband color difference signal. The combining means varies the bandwidth of the low frequency portion of the comb filtered chrominance signal to be combined with the comb filtered luminance signal in response to the detecting means.

It is also desirable that if the information content of the shared frequency band is high frequency modulated color difference information, then the bandwidth of the baseband color difference signal should be widened to include the information in the shared frequency band.

To determine whether the information in the shared frequency band is color difference information, signals in a frequency band just below the shared frequency band may be detected. If such signals are detected, this indicates that high frequency vertical detail information is present, and it is assumed to also occupy the shared frequency band. The bandwidth of the baseband color difference signal is narrowed and does not include the information in the shared frequency band.

On the other hand, if no such signals are detected, this indicates the lack of high frequency vertical detail information, and it is assumed that such information is not in the shared frequency band. The bandwidth of the baseband color difference signal is widened to include the information in the shared frequency band.

In accordance with another aspect of the present invention, the bandwidth of the baseband color difference signal is varied in response to the presence or absence of vertical detail information occupying the frequency band just below the shared frequency band. In an exemplary illustration of this aspect of the invention, the above circuit further includes a second detecting means which detects the presence of signals in the frequency band just below that shared by the high frequency vertical detail information and the modulated high frequency color difference information. The baseband color difference signal producer varies the bandwidth of the baseband color difference signal in response to the signal generated by the second detecting means.

Figure 1:
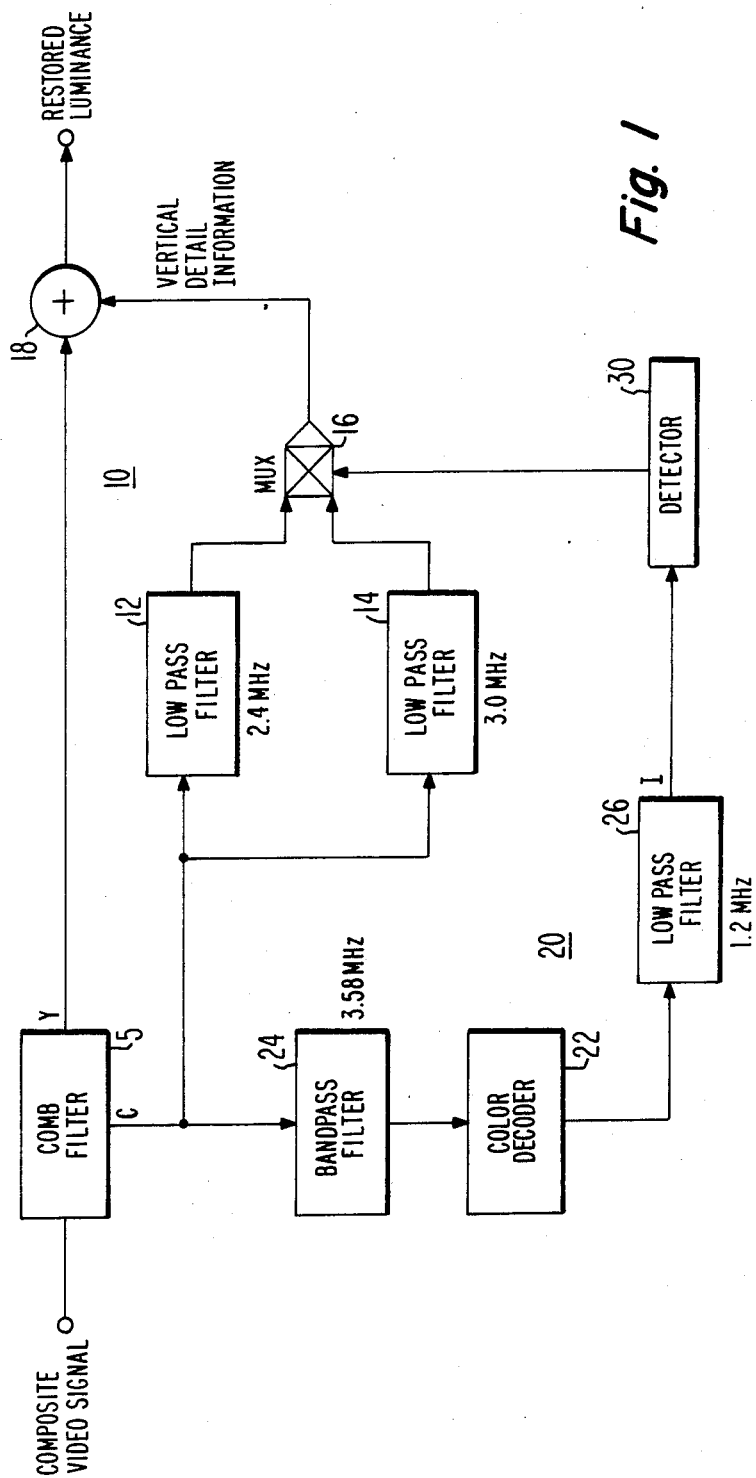
FIG. 1 is a block diagram of a vertical detail information restoration circuit in accordance with the principles of the present invention.

In FIG. 1 a comb filter 5 receives a composite video signal at an input, and produces at respective outputs comb filtered luminance, Y, and comb filtered chrominance, C, signals. The comb filtered chrominance signal C is applied to a baseband color difference signal producing means 20, comprising a bandpass filter 24, color decoder 22 and low-pass filter 26.

Band-pass filter 24 receives the comb filtered chrominance signal, and passes signals lying in the band of frequencies from 1.2 MHz below the color subcarrier frequency to 0.6 MHz above the color subcarrier frequency. The output of bandpass filter 24 is applied to color decoder 22. The color decoder 22 separates the I color difference signal from the band-pass filtered chrominance signal and generates a baseband I color difference signal. The baseband I color difference signal is applied to low-pass filter 26. The low-pass filter 26 has a pass-band of 1.2 MHz and produces the baseband I signal at its output.

The baseband I signal is applied to a detector 30. The detector 30 generates a control signal which represents presence or absence of signal information lying in the frequency band from 0.6 to 1.2 MHz. The detector 30 could, for example, be a correlator comprising the serial connection of a bandpass filter, a rectifier, and a low-pass filter. Another example of such a detector is described below with reference to FIG. 6.

The comb filtered chrominance signal C is also applied to a combining means 10 comprising low-pass filters 12 and 14, multiplexer (MUX) 16, and adder 18. The first low-pass filter 12 and second low-pass filter 14 each receive the comb filtered chrominance signal C. Low-pass filter 12 has a passband of 2.4 MHz. This filter passes only vertical detail information lying below the range of frequencies which could possibly be occupied by high frequency I information. Low-pass filter 14 has a passband of 3.0 MHz. This filter passes low frequency vertical detail information and high frequency vertical detail information in the shared frequency band.

The outputs of low-pass filter 12 and low-pass filter 14 are coupled to respective signal inputs of multiplexer 16. The output of detector 30 is coupled to the control input of multiplexer 16, and the signal output of multiplexer 16 is coupled to one input of adder 18. If detector 30 detects signal information in the frequency band from 0.6 MHz to 1.2 MHz of the baseband I signal, indicating the presence of high frequency I information, multiplexer 16 applies the narrower bandwidth signal from low-pass filter 12 as vertical detail information to adder 18.

If detector 30 does not detect signal information in the frequency band from 0.6 MHz to 1.2 MHz of the baseband I signal, indicating the absence of high frequency I information, multiplexer 16 applies the wider bandwidth signal from low-pass filter 14 as vertical detail information to adder 18.

Adder 18 receives at another input the comb filtered luminance signal Y, and produces at an output the restored luminance signal.

Figure 2:
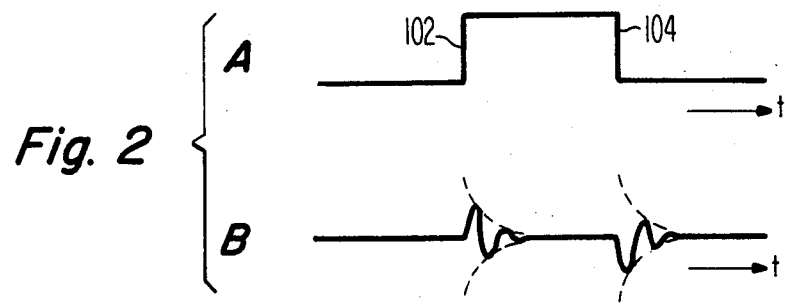
FIG. 2 is a waveform diagram of signals useful in understanding an advantage of the circuit illustrated in FIG. 1.

Waveform A of FIG. 2 illustrates a pulse signal which comprises a positive step 102 and a negative step 104. If a step function is passed through a bandpass filter, a decaying ringing signal is produced having the frequency of the center frequency of the bandpass filter, as illustrated in waveform B.

Figure 3:
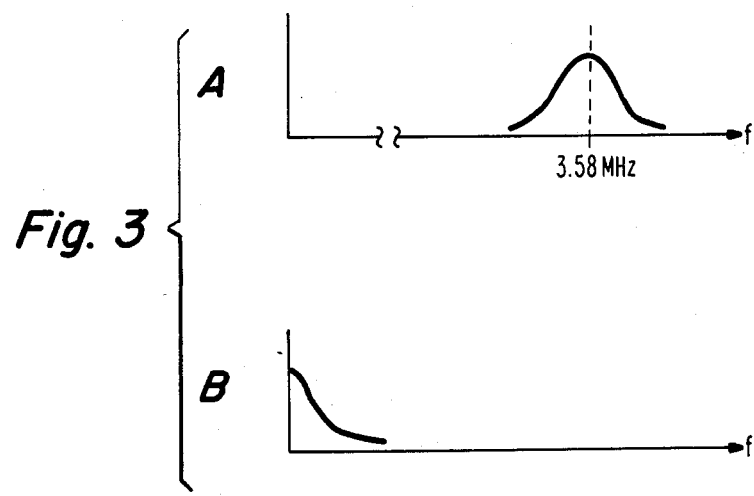
FIG. 3 shows spectral diagrams of signals useful in understanding an advantage of the circuit illustrated in FIG. 1.

Referring to FIG. 1, in the presence of a step in the comb filtered chrominance signal C, band-pass filter 24 produces a decaying ringing signal at about 3.58 MHz. Waveform A of FIG. 3 illustrates the spectrum of the output of bandpass filter 24 in response to a step input.

The color decoder 22 demodulates this signal to a decaying signal which is passed by low-pass filter 26 into the baseband I color difference signal. The spectrum of this decaying signal illustrated in waveform B of FIG. 3. Detector 30, however, responds only to frequencies in the band from 0.6 MHz to 1.2 MHz. The ringing at the output of bandpass filter 24 due to the step function in the comb filtered chrominance signal C thus does not affect the operation of this system. A signal representing letters with diagonal lines, when processed by apparatus according to the present invention, is, therefore, not subject to the degradation which was apparent in previous circuitry.

Figure 4:
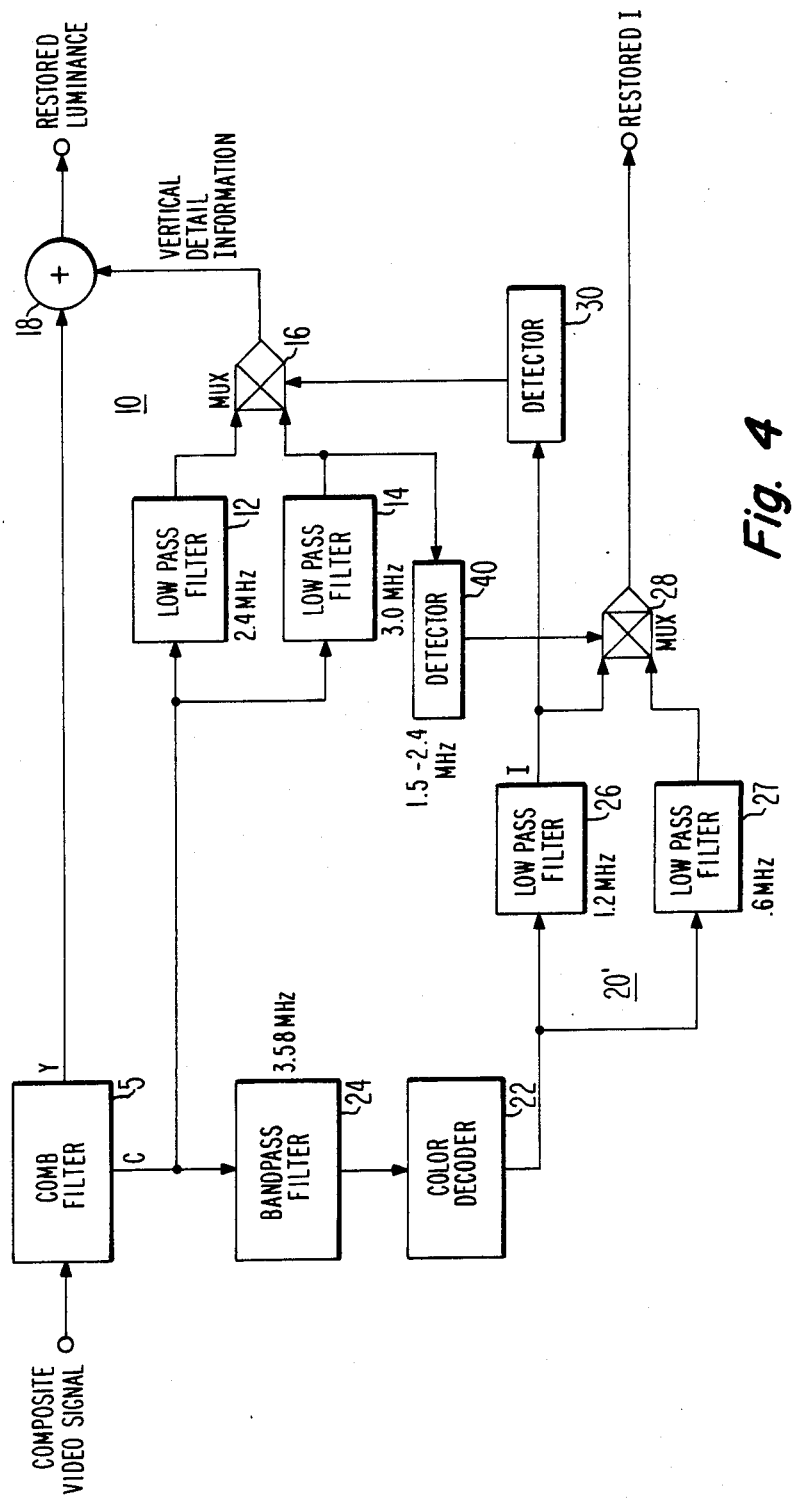
FIG. 4 is a block diagram of a vertical detail information restoration circuit in accordance with another aspect of the present invention.

FIG. 4 illustrates an embodiment according to another aspect of the present invention. In FIG. 4, elements similar to those in FIG. 1 are numbered the same and operate in the manner described above with respect to FIG. 1. FIG. 4 illustrates a system which adaptively varies the bandwidth of the vertical detail information signal restored to the comb filtered luminance signal, and adaptively varies the bandwidth of the I color difference signal. The means 20' for producing the baseband color difference signal includes band-pass filter 24, color decoder 22 and low-pass filter 26 as illustrated in FIG. 1, and also includes a low-pass filter 27 and a multiplexer (MUX) 28. Low-pass filter 27 receives its input from the I signal output of the color decoder. The pass-band of low-pass filter 27 is 0.6 MHz. Multiplexer 28, responsive to a control signal from a detector 40, couples the output from either low-pass filter 26, or low-pass filter 27 to the restored I signal output.

Detector 40 is coupled to the output of low-pass filter 14 and generates a signal which indicates the presence of information in the frequency band from 1.5 MHz to 2.4 MHz of the comb filtered chrominance signal. This frequency band (1.5 MHz to 2.4 MHz) is just below the shared frequency band, and can be occupied only by high frequency vertical detail information, if it is present. The output of detector 40 is coupled to the control input of multiplexer 28.

If a signal is detected occupying this frequency band, it indicates that high frequency detail information is being transmitted in the composite video signal. Under such circumstances, it is assumed that high frequency vertical detail information also occupies the shared frequency band. Consequently, the narrower bandwidth signal from low-pass filter 27 is connected to the signal output of multiplexer 28, thus eliminating information in the shared frequency band from the baseband I color difference signal. If no signal is detected in the frequency band from 0.5 MHz to 2.5 MHz, it is assumed that the shared frequency band does not contain any high frequency vertical detail information. Consequently, the wider bandwidth signal from low-pass filter 26 is coupled to the signal output of multiplexer 28, thus including information in the shared frequency band in the baseband I color difference signal.

Figure 5:
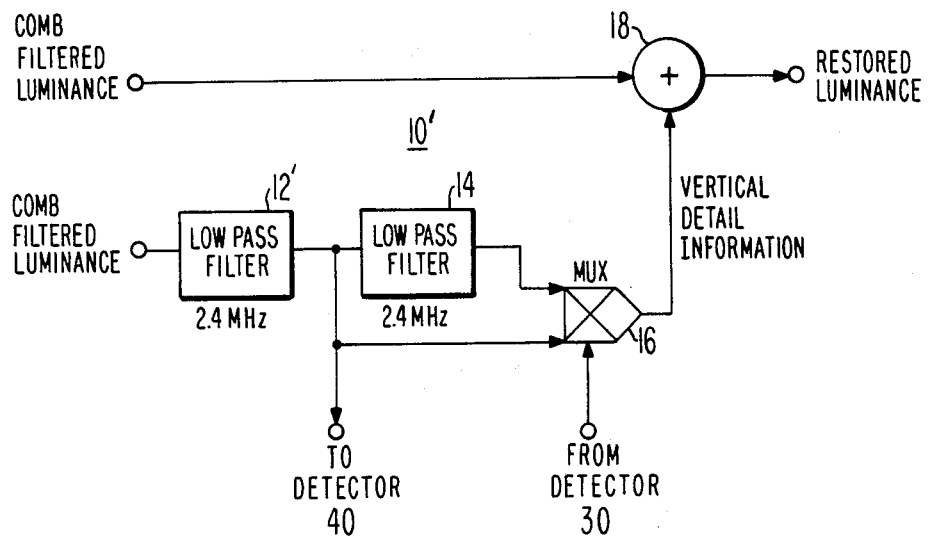
FIG. 5 is a block diagram of an alternate embodiment for adaptive filters illustrated in FIGS. 1 and 4.

FIG. 5 illustrates an alternate embodiment of an arrangement for varying the bandwidth of an input signal in response to a control signal. Elements similar to those shown in FIGS. 1 and 4 are numbered the same. FIG. 5 illustrates an embodiment of the means 10' for combining vertical detail information and comb filtered luminance information. In FIG. 5, the cascade connection of low-pass filters 12' and 14 has an input coupled to the source of comb filtered chrominance signals and an output coupled to one input of multiplexer 16. The other input of multiplexer 16 is coupled to the output of low-pass filter 12'.

Each of low-pass filters 12' and 14 have a pass-band of 2.4 MHz. The frequency response of the cascade connection, however, will have a steeper rolloff at the cutoff frequency, thus effectively narrowing the pass-band. In FIG. 4, the output of the 3.0 MHz low-pass filter is coupled to the input of detector 40. In FIGS. 1 and 4, the control signal from the output of detector 30 is coupled to the control input of multiplexer 16. When a wideband signal is desired, multiplexer 16 couples the output of low-pass filter 12' to the input to adder 18. When a narrow band signal is desired, multiplexer 16 couples the output of low-pass filter 14 to the input of adder 18.

A similar arrangement may be used in the baseband color difference signal producer 20 illustrated in FIG. 4, to vary the bandwidth of the baseband I color difference signal.

Figure 6:
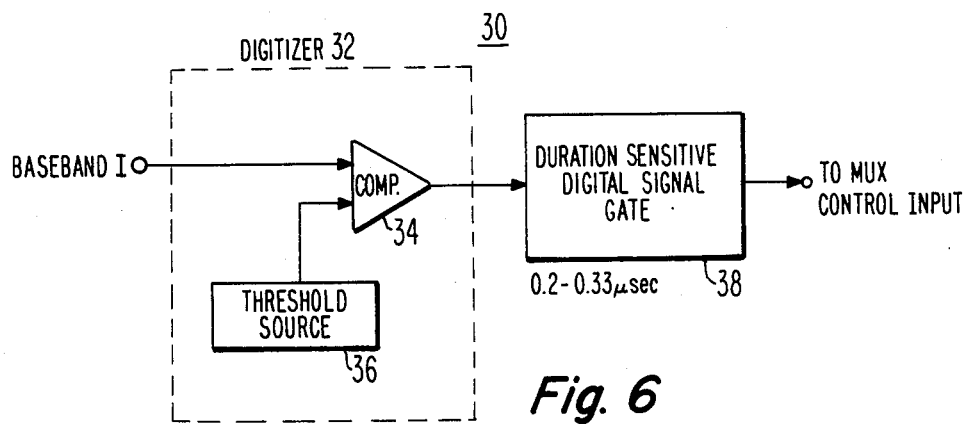
FIG. 6 is a block diagram of an alternate embodiment for detectors illustrated in FIGS. 1 and 4.

FIG. 6 illustrates a detector which may be used in the embodiments illustrated in FIGS. 1 and 4. In particular, detector 30 could include the cascade connection of digitizer 32 and duration-sensitive digital signal gate 38 coupled between the output of low-pass filter 26 and the control input of multiplexer 16 (of FIG. 1). Digitizer 32 produces a sequence of pulses corresponding to the input signal. Digitizer 32 could, for example, include a comparator 34 which generates a "1" signal when the input signal is above a level supplied by threshold source 36, and a "0" signal otherwise. This digital pulse sequence is applied to duration-sensitive signal gate 38. The signal gate 38 produces an output which is "1" in the presence of pulses having a pulse width corresponding to signals within the prescribed frequency band and "0" otherwise. Concurrently filed U.S. patent application Ser. No. 760,911 entitled "Digital Pulse Width Detector", by L. A. Harwood and R. A. Wargo describes such a signal gate in greater detail. Referring to FIGS. 1 and 4, multiplexer 16 couples the appropriate signal to adder 18 depending upon the presence or absence of signals within the frequency band as indicated by a "1" or "0" at the output of the duration-sensitive signal gate 38.

A similar combination of digitizer 32 and duration-sensitive digital signal gate 38 may be used for detector 40 (of FIG. 4) which is coupled between the output of low-pass filter 14 and the control signal input of multiplexer 28.

It will be appreciated by one skilled in the art that the illustrated embodiments of FIGS. 1 and 4 could be either analog or digital embodiments. In addition, either sample data analog or continuous analog implementation is possible.

What is claimed is:

1. In a system for processing a composite video signal, including a source of a comb filtered chrominance sigal and a source of a comb filtered luminance signal, a vertical detail information restoration circuit, comprising:
   means coupled to said comb filtered chrominance signal source for producing a baseband color difference signal;
   means coupled to said baseband color difference signal procuding means for detecting the presence of information in a relatively high frequency portion of said baseband color difference signal; and
   means for combining a relatively low frequency portion of said comb filtered chrominance signal with said comb filtered luminance signal, wherein the bandwidth of said portion of said chrominance signal is varied responsive to said detecting means.

2. The circuit of claim 1, wherein said means for combining comprises:
   a first low-pass filter having an input terminal coupled to said comb filtered chrominance signal source, and an output terminal;
   a second low-pass filter having an input terminal coupled to said comb filtered chrominance signal source, and an output terminal;
   a multiplexer having a first signal input terminal coupled to the output terminal of said first low-pass filter, a second signal input terminal coupled to the output terminal of said second low-pass filter, a control input terminal coupled to said detecting means, and a signal output terminal; and
   an adder having a first input terminal coupled to said luminance signal source, a second input terminal coupled to the signal output terminal of said multiplexer, and an output terminal for producing a restored luminance signal.

3. The circuit of claim 2, wherein the input terminal of said second low-pass filter is coupled to the output terminal of said first low-pass filter.

4. The circuit of claim 1, wherein said baseband color difference signal producing means comprises:
- a band-pass filter having an input terminal coupled to said comb filtered chrominance signal source, and an output terminal, and having a pass-band for passing frequencies normally occupied by the chrominance component of said composite video signal;
- a color decoder having an input terminal coupled to said band-pass filter, and an output terminal, for extracting said baseband color difference signal; and
- a low-pass filter having an input terminal coupled to said color decoder and having a pass-band substantially equal to the bandwidth of said baseband color difference signal.

5. The circuit of claim 1, wherein said detecting means comprises:
- means having an input terminal coupled to said baseband color difference signal producing means for generating a signal having a first state when the signal at said input exceeds a given threshold level, and a second state otherwise; and
- means having an input terminal coupled to said signal generator, for producing a control signal indicating that the signal at said input terminal has said first state for a duration longer than a given minimum duration and shorter than a given maximum duration.

6. In a system for processing a composite video signal, including a source of a comb filtered chrominance signal and a source of a comb filtered luminance signal, wherein said comb filtered chrominance signal may include relatively low frequency vertical detail information and relatively high frequency modulated color difference information, and includes a frequency band shared by both information, a vertical detail information restoration circuit comprising:
- first detecting means coupled to said comb filtered chrominance signal source for detecting the presence of information in a frequency band just below said frequency band shared by said modulated color difference information and said vertical detail information;
- means coupled to said comb filtered chrominance signal source for producing a baseband color difference signal, wherein the bandwidth of said baseband color difference signal is varied responsive to said first detecting means;
- second detecting means coupled to said baseband color difference signal producing means for detecting the presence of information in a relatively high frequency portion of said baseband color difference signal; and
- means for combining a relatively low frequency portion of said comb filtered chrominance signal with said comb filtered luminance signal, wherein the bandwidth of said portion of said chrominance signal is varied in response to said second detecting means.

7. The circuit of claim 6, wherein said baseband color difference signal producing means comprises:
- a color decoder having an input terminal coupled to said comb filtered chrominance signal source and having an output terminal, for extracting said baseband color difference signal;
- a first low-pass filter having an input terminal coupled to said baseband color decoder, and having an output terminal;
- a second low-pass filter having an input terminal coupled to said baseband color decoder, and having an output terminal; and
- a multiplexer having a first signal input terminal coupled to the output terminal of said first low-pass filter, a second signal input terminal coupled to the output terminal of said second low-pass filter, a control input terminal coupled to said first detecting means, and a signal output terminal.

8. The circuit of claim 7, wherein the input terminal of said second low-pass filter is coupled to the output terminal of said first low-pass filter.

9. The circuit of claim 6, wherein said first detecting means comprises:
- means having an input terminal coupled to said comb filtered chrominance signal source for generating a signal having a first state when the signal at said input exceeds a given threshold level, and a second state otherwise; and
- means having an input terminal coupled to said signal generator, for producing a control signal indicating that the signal at said input has said first state for a duration longer than a given minimum duration, and shorter than a given maximum duration.

* * * * *